United States Patent
Chapel

(10) Patent No.: US 6,628,009 B1
(45) Date of Patent: Sep. 30, 2003

(54) LOAD BALANCED POLYPHASE POWER DISTRIBUTING SYSTEM

(75) Inventor: Steven G. Chapel, Broomfield, CO (US)

(73) Assignee: The Root Group, Inc., Boulder, CO (US)

( * ) Notice: Subject to any disclaimer, the term of this patent is extended or adjusted under 35 U.S.C. 154(b) by 0 days.

(21) Appl. No.: 09/680,670

(22) Filed: Oct. 6, 2000

(51) Int. Cl.⁷ .................................................. H02J 3/26
(52) U.S. Cl. ........................................ 307/14; 307/34
(58) Field of Search ............................ 307/13, 18, 14, 307/52, 53, 32, 34; 361/604, 622, 627, 826

(56) References Cited

U.S. PATENT DOCUMENTS

| | | | | |
|---|---|---|---|---|
| 3,500,056 A | * | 3/1970 | Riley | 307/13 |
| 3,818,237 A | * | 6/1974 | Straus | 307/64 |
| 4,775,328 A | * | 10/1988 | McCarthy | 439/211 |
| 4,866,295 A | * | 9/1989 | Leventis et al. | 307/43 |
| 5,046,963 A | * | 9/1991 | Kelly | 439/211 |
| 5,281,859 A | * | 1/1994 | Crane | 307/139 |
| 5,582,522 A | * | 12/1996 | Johnson | 439/214 |
| 5,604,385 A | * | 2/1997 | David | 307/52 |
| 5,608,275 A | * | 3/1997 | Khosrowpour | 307/130 |
| 5,682,298 A | * | 10/1997 | Raynham | 174/250 |
| 5,682,301 A | * | 10/1997 | Kraft | 361/826 |
| 5,917,250 A | * | 6/1999 | Kakalec et al. | 307/18 |
| 5,934,096 A | | 8/1999 | Munson et al. | 62/298 |
| 6,121,693 A | * | 9/2000 | Rock | 307/18 |
| 6,190,199 B1 | * | 2/2001 | Bump et al. | 439/502 |
| 6,229,691 B1 | * | 5/2001 | Tanzer et al. | 361/610 |
| 6,320,732 B1 | * | 11/2001 | Norman et al. | 361/62 |
| 6,349,516 B1 | * | 2/2002 | Powell et al. | 52/239 |

FOREIGN PATENT DOCUMENTS

FR 2535144 * 10/1982

OTHER PUBLICATIONS

Redundant Power Distribution System with Full Concurrent Maintenance, IBM Technical Disclosure Bulletin, Feb. 1, 1994. vol. 37, Issue 2A, p. 461–464.*

* cited by examiner

*Primary Examiner*—Brian Sircus
*Assistant Examiner*—Sharon Polk
(74) *Attorney, Agent, or Firm*—Greenlee, Winner & Sullivan, P.C.

(57) ABSTRACT

The invention is an apparatus and a method for connecting loads to a polyphase power distribution system in such a way that the loads on the individual phases of the system are balanced. The apparatus includes an equipment rack having multiple electrical equipment mounting positions and multiple electrical outlets wherein contiguous groups of mounting positions are adjacent to groups of outlets connected to different phases. The apparatus also provides for other groups of outlets adjacent to the mounting positions to be connected to different power sources for increased reliability when the equipment has redundant power supplies.

17 Claims, 4 Drawing Sheets

LOAD BALANCED POLYPHASE POWER DISTRIBUTING SYSTEM

FIELD OF THE INVENTION

This invention relates generally to electrical power distribution systems and particularly to apparatus and methods for balancing the loads on the individual phases of polyphase distribution systems.

BACKGROUND OF THE INVENTION

In polyphase power distribution systems, it is desirable to balance the loads on the individual phases of the system. Ideally, the loads on all the phases should be equal (that is, balanced) because a polyphase system delivers maximum power when all the phases are supplying their maximum rated current. For example, it would be unacceptable for the loads on one phase to exceed its current rating while the loads on another phase were below its current rating. As used herein, the word "balanced" means that the loads on the individual phases are equal within acceptable limits for the power distribution system in use; however, it does not mean that the loads on each phase are exactly equal or that the loads on all phases are non-zero.

Traditionally, load-balancing is accomplished by the electrician wiring the system. To do this the electrician must keep an accounting of the power requirements of all the loads on each phase and add loads to, or remove loads from, each phase as necessary to achieve the desired balance. This method is not only tedious and time consuming during the installation of the system but it also requires the services of a skilled electrician whenever loads are added or removed throughout the life of the system.

It is therefore an object of this invention to provide a simple means for achieving acceptable load balancing without the need for wiring, or rewiring, by a skilled electrician.

U.S. Pat. No. 5,934,096 discloses a wiring system for commercial refrigeration which permits power to be balanced among three phases of electrical power. Patent '096, in the paragraph extending from column 7, line 50 to column 8, line 4, states that an installer can choose which phases of the electrical power will be sent to the lights and fans and which to the electric defrost by simple rotation of the connectors relative to each other. This requires that the installer know the load distribution on the three phases in order to choose which relative orientation of the connectors to use. In the present invention, such knowledge is not required.

BRIEF SUMMARY OF THE INVENTION

The invention comprises an apparatus, and a simple method, for connecting loads to a polyphase power distribution system in such a way that the loads on the individual phases of the system are balanced. The balancing is accomplished without requiring the installer to know the load distribution on the, phases.

The apparatus comprises an equipment rack or frame having multiple equipment mounting positions and multiple single-phase electrical outlets, or receptacles, adjacent to the mounting positions. Each outlet is connected to one of the N phases of a polyphase power distribution system in such a way that when pieces of equipment are mounted in the rack and plugged into adjacent outlets in an orderly fashion, adequate load balancing is accomplished automatically.

For example, in a three-phase system, the outlets are wired to the phases as follows: a first outlet group to phase 1, a second outlet group to phase 2, a third outlet group to phase 3, a fourth outlet group to phase 1, a fifth outlet group to phase 2, a sixth outlet group to phase 3, an $i^{th}$ outlet group to phase 1, an $(1+i)^{th}$ outlet group to phase 2, an $(2+i)^{th}$ outlet group to phase 3, and so on to the total number of outlets in the apparatus. The outlets and the mounting positions for the loads are physically arranged on the rack in rows and columns such that the natural row-and-column order of mounting the loads contiguously in the rack leads to plugging the loads into the outlet groups in counting-number sequence. In other words, the first loads are plugged into the first outlet group, the second loads into outlet 2, the third loads into outlet 3, etc.

Preferably, the apparatus also provides another group of outlets, adjacent to each mounting position, which is connected to and supplied by a different source. The additional outlets permit redundant power supplies in each piece of equipment to be connected to separate and independent sources for greater reliability.

As used herein, the word "outlet" means the point at which a load can be connected to a power distribution system while the word "receptacle" refers to the hardware device for receiving an electrical plug. The term "outlet" is not limited to specific type of hardware.

DETAILED DESCRIPTION OF THE INVENTION

Figure 1:
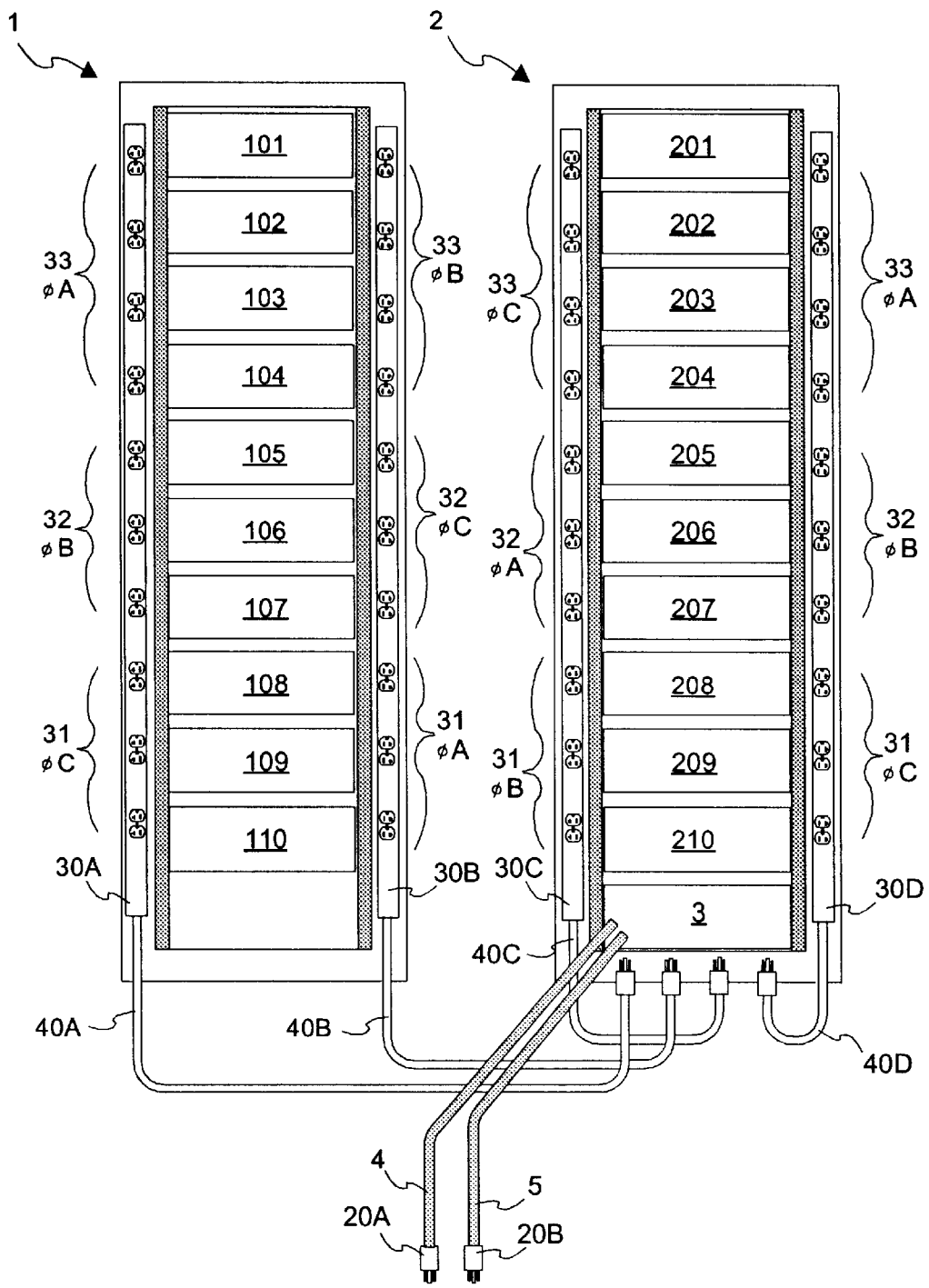
FIG. 1 is a diagram of a preferred embodiment of the invention.

In the drawings, like reference numerals indicate like features; and, a reference numeral appearing in more than one figure refers to the same element. The drawings and the following detailed descriptions show specific embodiments of the invention. Numerous specific details including materials, dimensions, and products are provided to illustrate the invention and to provide a more thorough understanding of the invention. However, it will be obvious to one skilled in the art that the present invention may be practiced without these specific details.

A schematic diagram of a preferred embodiment of the invention is shown in FIG. 1. This embodiment comprises a first equipment rack 1 and a second equipment rack 2 each having multiple equipment mounting positions, hereinafter referred to as bays, for mounting power consuming equipment, hereinafter referred to as loads. Rack 1 comprises equipment bays 101–110 and rack 2 comprises equipment bays 201–210. The loads in bays 101–110 are plugged into first power strip 30A and second power strip 30B which are mounted on the left and right sides, respectively, of rack 1. Likewise, the loads in bays 201–210 are plugged into third power strip 30C and fourth power strip 30D which are mounted on the left and right sides, respectively, of rack 2. Equipment rack 2 also comprises power distribution assembly 3. Power strips 30A–30D are plugged into and supplied by power distribution assembly 3. Assembly 3 is connected to and supplied by two external three-phase power distribution systems (not shown) hereinafter referred to as power sources S1 and S2. Each of the two power sources comprises five conductors (wires) providing the three phases ($\phi$A, $\phi$B and $\phi$C) as well as neutral and ground. Assembly 3 is connected to sources S1 and S2 by power input cables 4 and 5 and power input plugs 20A and 20B, respectively.

Figure 2:
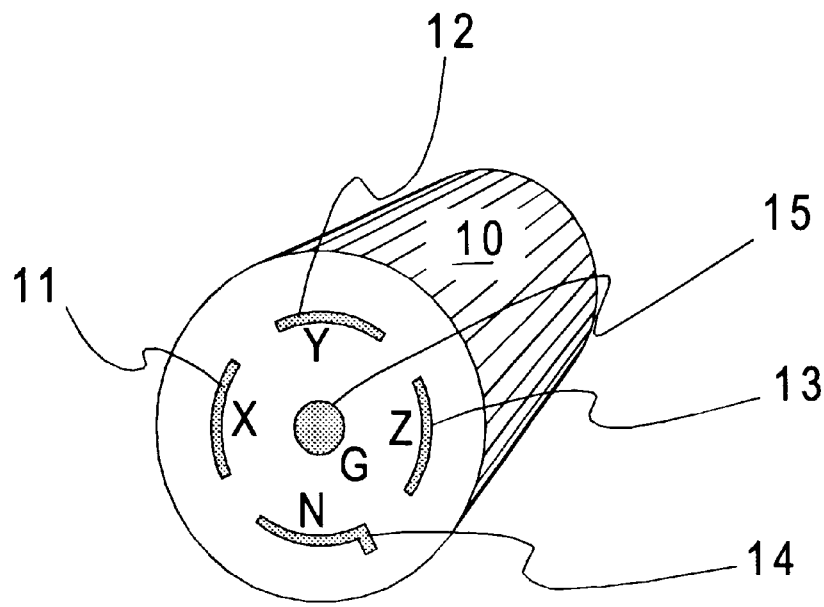
FIG. 2 is a diagram of a three-phase receptacle.

FIG. 2 is a drawing of a typical three-phase receptacle 10 comprising three line sockets 11, 12 and 13 commonly labeled X, Y and Z, respectively, a neutral socket 14 commonly labeled N, and a ground socket 15.

Figure 3:
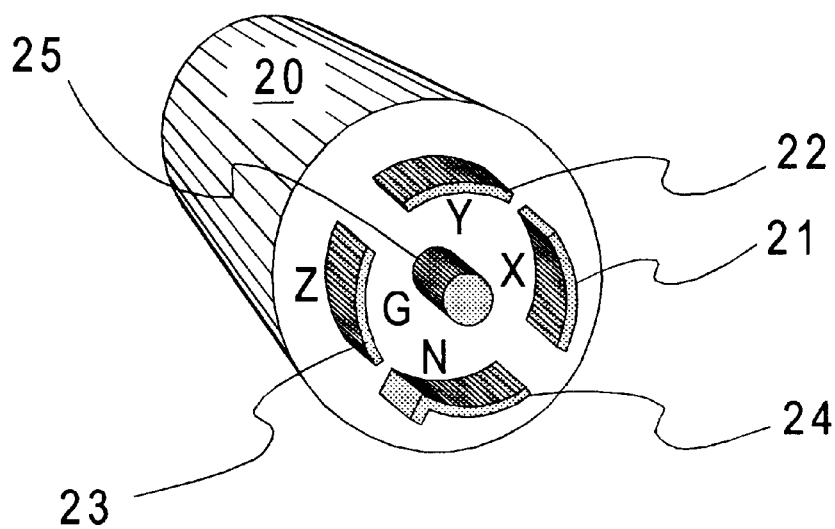
FIG. 3 is a diagram of a three-phase plug.

FIG. 3 is a drawing of a typical three-phase plug 20, for mating with receptacle 10, comprising three line blades 21, 22 and 23, commonly labeled X, Y and Z, respectively, a neutral blade 24, commonly labeled N, and a ground pin 25.

The location and shape of the blades and pin of plug 20 and the corresponding sockets of receptacle 10 are designed to ensure that the plug and socket can be mated only one way. The keys on the neutral blade and socket may point inward or outward, depending on the type and current rating of the plug and socket.

The drawings in FIGS. 2 and 3 represent the sockets 10A–10D and plugs 20A–20B in the following descriptions.

Figure 4:
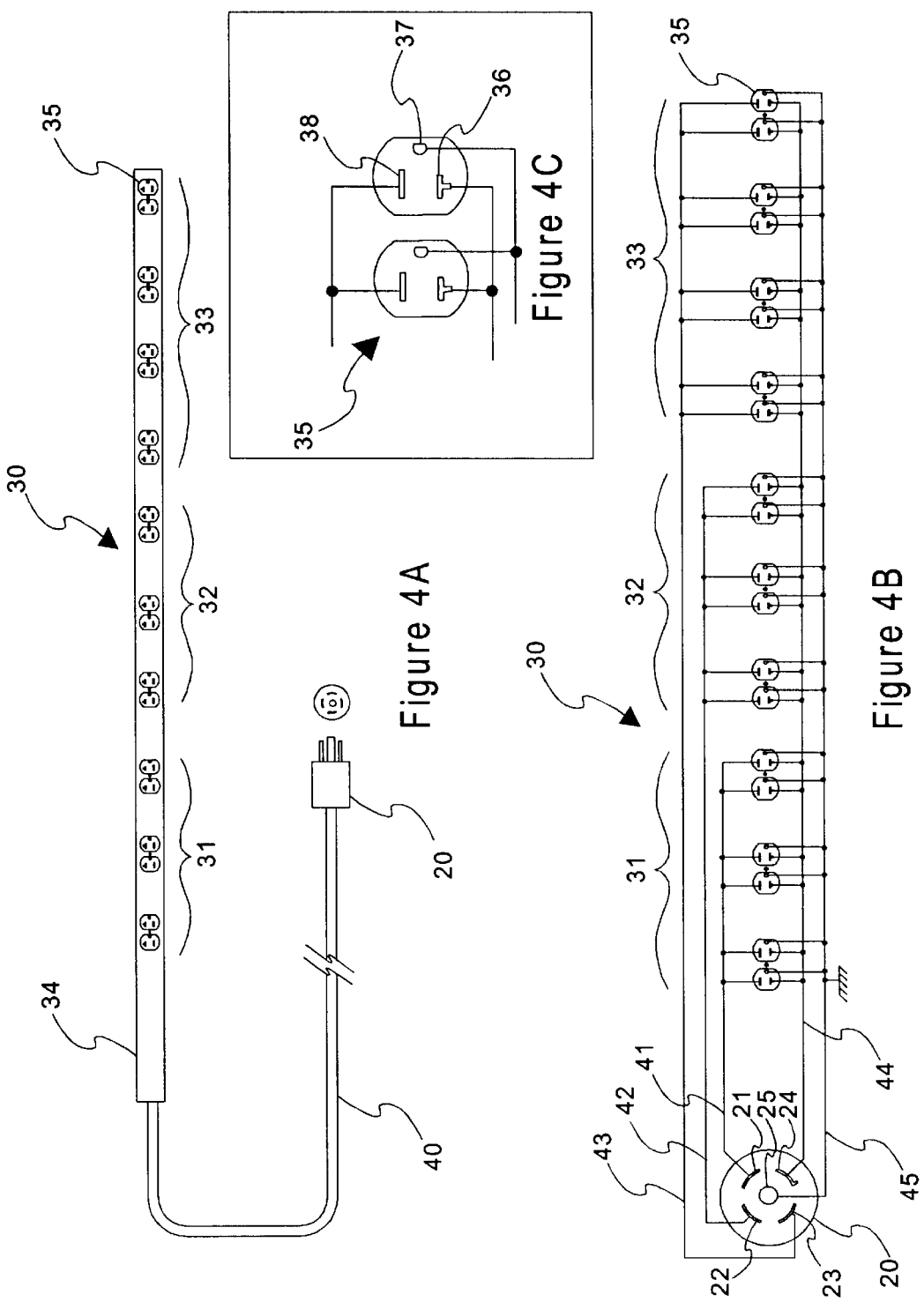
FIG. 4A is a diagram of a power strip.
FIG. 4B is a schematic diagram of a power strip wiring.
FIG. 4C is an enlarged view of a portion of FIG. 4B.

FIG. 4A is a drawing of a power strip 30 as used for each of the power strips 30A–30D in FIG. 1. Power strip 30 comprises an enclosure 34 containing ten single-phase duplex receptacles 35 arranged in three groups, a first group 31, a second group 32 and a third group 33. FIG. 4B is a schematic diagram of the wiring of power strip 30 and FIG. 4C is an enlarged view of the typical wiring of a receptacle 35. As shown in FIGS. 4B and 4C, receptacles 35 are connected by a four-conductor (plus ground) power strip cable 40 to a three-phase plug 20. The neutral conductor 44 of cable 40 connects the neutral socket 36 of all the receptacles 35 to the neutral blade 24 of plug 20. The conductor 45 of cable 40 connects the enclosure 34 and the ground terminals 37 of all the receptacles 35 to the center pin 25 of plug 20. The line socket 38 of each receptacle in group 31 is connected by conductor 41 to blade 21 of plug 20. The line socket 38 of each receptacle in group 32 is connected by conductor 42 to blade 22 of plug 20. The line socket 38 of each receptacle in group 33 is connected by conductor 43 to blade 23 of plug 20.

Referring back to FIG. 1, the inputs to power distribution assembly 3 are connected to the two external three-phase power distribution systems (not shown) via two four-conductor (plus ground) power input cables 4 and 5 and power input plugs 20A and 20B. The outputs of assembly 3 comprise four three-phase, four-conductor (plus ground) receptacles 10A–10D.

Figure 5:
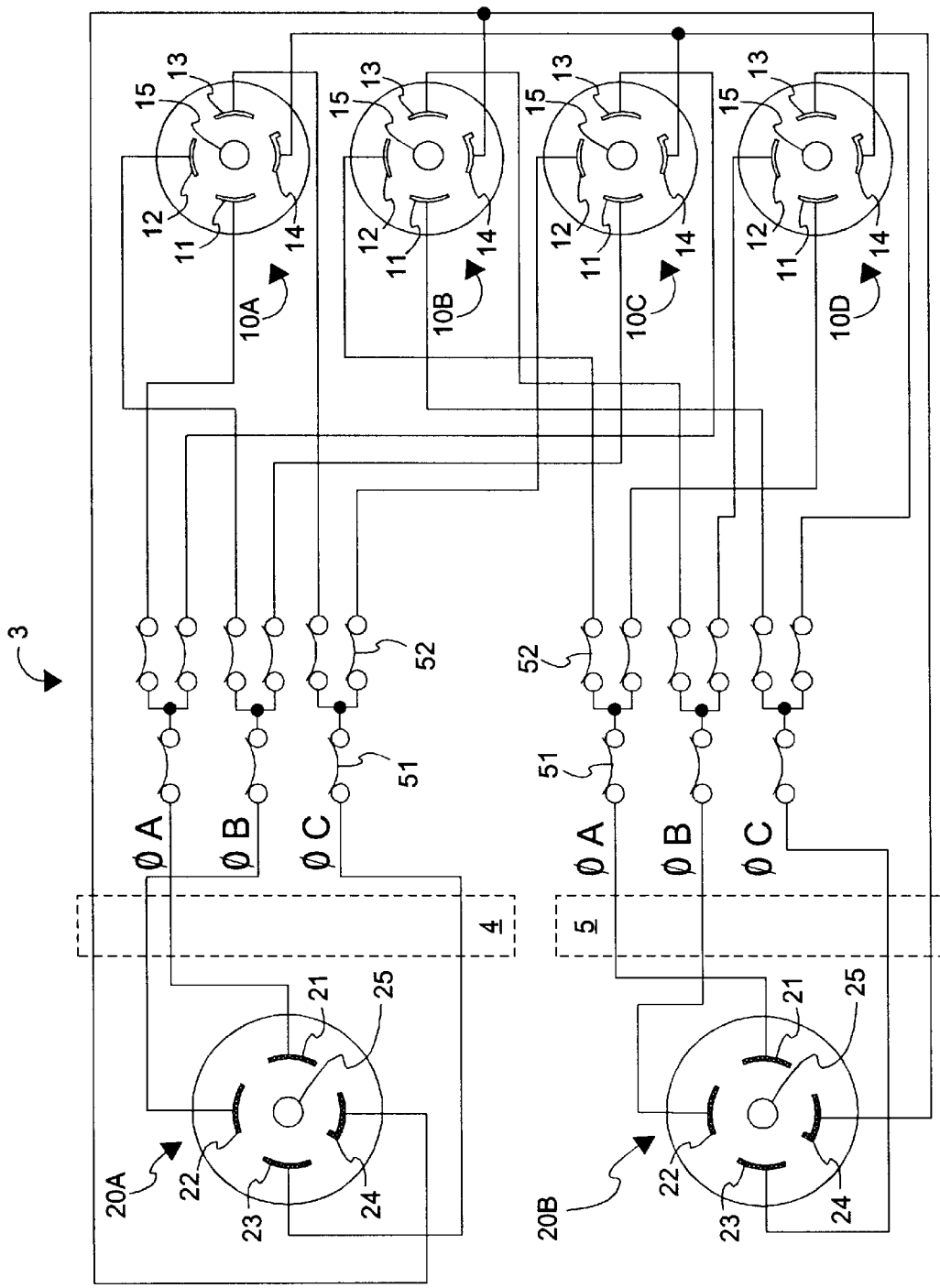
FIG. 5 is a schematic diagram of a power distribution assembly.

Referring to FIG. 5, power distribution assembly 3 comprises a first receptacle 10A, a second receptacle 10B, a third receptacle 10C and a fourth receptacle 10D. Receptacles 10A–10D correspond to and mate with the plugs on cables 40A–40D (respectively) in FIG. 1.

Sockets 14 of receptacles 10A and 10C are connected through the neutral conductor of power input cable 4 and blade 24 of plug 20A to the neutral socket and conductor of source S1. Likewise, sockets 14 of receptacles 10B and 10D are connected through the neutral conductor of power input cable 5 and blade 24 of plug 20B to the neutral socket and conductor of source S2.

Sockets 15 of receptacles 10A–10D are connected through the ground conductors (not shown) of power input cables 4 and 5 and pins 25 of plugs 20A and 20B to the ground sockets and conductors (not shown) of both sources S1 and S2. The ground conductors of power input cables 4 and 5 are also bonded to a metallic case (not shown) enclosing power distribution assembly 3.

In plug 20A, blades 21, 22 and 23 obtain $\phi$A, $\phi$B and $\phi$C, respectively, from a receptacle connected to source S1. Sockets 11, 12 and 13 of receptacle 10A are connected via circuit breakers 51 and 52 and the line conductors in cable 4 to blades 21, 22 and 23, respectively, of plug 20A. Likewise, sockets 13, 11 and 12 of receptacle 10C are connected to blades 21, 22 and 23, respectively, of plug 20A.

In plug 20B, blades 21, 22 and 23 obtain $\phi$A, $\phi$B and $\phi$C, respectively, from a receptacle connected to source S2. Sockets 12, 13 and 11 of receptacle 10B are connected via circuit breakers 51 and 52 and the line conductors in cable 5 to blades 21, 22 and 23, respectively; of plug 20B. Likewise sockets 11, 12 and 13 of receptacle 10D, are connected to blades 21, 22 and 23, respectively, of plug 20B.

Referring now to FIG. 1, on the left side of rack 1, in power strip 30A, the four receptacles in group 33 adjacent to the four equipment bays 101–104 are connected to $\phi$A; the three receptacles in group 32 adjacent to bays 105–107 are connected to $\phi$B; and the three receptacles in group 31 adjacent to bays 108–110 are connected to $\phi$C. Power strip 30A is connected through cable 40A, assembly 3, cable 4 and plug 20A to source S1.

On the right side of rack 1, in power strip 30B, the four receptacles in group 33 adjacent to the four equipment bays 101–104 are connected to $\phi$B; the three receptacles in group 32 adjacent to bays 105–107 are connected to $\phi$C; and the three receptacles 31 adjacent to bays 108–110 are connected to $\phi$A. Power strip 30B is connected through cable 40B, assembly 3, cable 5 and plug 20B to source S2.

On the left side of rack 2, in power strip 30C, the four receptacles in group 33 adjacent to the four equipment bays 201–204 are connected to $\phi$C; the three receptacles in group 32 adjacent to bays 205–207 are connected to $\phi$A; and the three receptacles in group 31 adjacent to bays 208–210 are connected to $\phi$B. Power strip 30C is connected through cable 40C, assembly 3, cable 4 and plug 20A to source S1.

On the right side of rack 2, in power strip 30D, the four receptacles in group 33 adjacent to the four equipment bays 201–204 are connected to $\phi$A; the three receptacles in group 32 adjacent to bays 205–207 are connected to $\phi$B; and the three receptacles in group 31 adjacent to bays 208–210 are connected to $\phi$C. Power strip 30D is connected through cable 40D, assembly 3, cable 5 and plug 20B to source S2.

Typically, present generation Information Technology equipment is equipped with dual redundant power supplies intended to be powered by separate power sources for more reliable operation. Such equipment therefore utilizes, for each load, two separate power cables with attached plugs for connecting to two receptacles. Supplying power from different phases or sources to each of the two receptacles enhances the reliability of the power delivery in addition to balancing the loads.

Normally, loads are installed in racks sequentially from top to bottom and plugged into the nearest receptacles. Following this procedure for rack 1 as shown in FIG. 1, each piece of equipment installed in bays 101–104 will have one redundant power supply plugged into one of the receptacles in group 33 of power strip 30A and the other redundant power supply plugged into one of the receptacles in group 33 of power strip 30B. Each piece of equipment in bays 101–104 will thereby have one power supply connected to $\phi$A of source S1 and the other power supply connected to $\phi$B of source S2. Likewise, each piece of equipment in bays 105–107 will have one power supply connected to $\phi$B of source S1 and the other power supply connected to φC of source S2. And, each piece of equipment in bays 108–110 will have one power supply connected to φC of source S1 and the other power supply connected to φA of source S2.

Continuing this process to rack 2, each piece of equipment in bays 201–204 will have one power supply connected to φC of source S1 and the other power supply connected to φA of source S2. Likewise, each piece of equipment in bays 205–207 will have one power supply connected to φA of source S1 and the other power supply connected to φB of source S2. Also, each piece of equipment in bays 208–210 will have one power supply connected to φB of source S1 and the other power supply connected to φC of source S2.

In this way, no more than four loads in one rack will be connected to any one phase supplied by the same source. As additional racks are populated, preferably each rack is filled before the next one is started. Then, for each source, the maximum number of loads on any phase will not exceed the minimum number on any other phase by more than four.

The embodiment described herein is optimum for a particular rack of computer equipment using three-phase power. However, in other applications, it may be preferable to use split-phase power (i.e., single-phase center-tapped) or to connect to a distribution system using a three-phase delta configuration instead of the wye configuration described. Or, for example, it may be preferable to arrange the connections to the outlets in such a way that the phases rotate sequentially down the racks (columns) in groups of only one or two receptacles (or one dual receptacle) per phase instead of the six or eight receptacles (or three or four dual receptacles) per phase shown in this embodiment. Many such alternate spatial arrangements providing a desired phase rotation sequence will be readily understood by those skilled in the art. Such alternate arrangements can be economically embodied by only altering the connections within the power strip. For example, in FIG. 4B, instead of all three dual receptacles 35 in group 31 being connected to conductor 41, one could be connected to each of the three conductors 41, 42 and 43. Likewise, in groups 32 and 33, each adjacent receptacle could be connected to a different one of conductors 41, 42 and 43. Regardless of the phase rotation within the strips, because of the phase rotation within the power distribution assembly, load sharing and balancing will still tend to occur at the power sources as the number of loads is increased (including when more racks are added).

All references mentioned herein are hereby incorporated by reference to the extent that they are not inconsistent with the present disclosure.

What is claimed is:

1. A system for balancing loads in a polyphase power distribution system having N phases, comprising:
   a plurality of power strips, each of said strips comprising:
      N groups of electrical outlets, each of said outlets having a line socket; and
      N conductors, each of said N conductors connected to all said line sockets in a different one of said N groups of outlets; and
   a power distribution assembly for manually connecting each of said N conductors in each of said strips to a different predetermined one of said N phases and for manually connecting corresponding conductors in different strips to different predetermined phases.

2. A system as in claim 1 wherein each of said power strips comprises a cable and plug for connecting to said power distribution assembly.

3. A system as in claim 1 wherein said power distribution assembly comprises a plurality of receptacles for connecting said power strips to said assembly.

4. A system as in claim 1 wherein said power distribution assembly comprises a power input cable and a power input plug for connecting said assembly to a power source.

5. A system as in claim 1 further comprising an equipment rack having one or more of said power strips mounted on said rack.

6. A system as in claim 5 wherein said rack comprises a plurality of equipment-mounting positions and wherein each of said groups of outlets occupies a corresponding location in each of said power strips and wherein each said location is adjacent to a corresponding equipment-mounting position on said rack.

7. A system as in claim 1 further comprising an equipment rack having two or more of said power strips mounted on said rack wherein each of said two or more power strips is connected via said assembly to a different power source.

8. A system as in claim 7 wherein said rack comprises a plurality of equipment-mounting positions and wherein each of said groups of outlets occupies a corresponding location in each of said power strips and wherein each said location is adjacent to a corresponding equipment-mounting position on said rack.

9. A system as in claim 1 wherein each of said plurality of power strips comprises a cable and plug for connecting to said power distribution assembly and wherein said power distribution assembly comprises a plurality of receptacles for receiving said plug from each of said plurality of power strips.

10. A system as in claim 1 wherein said power distribution assembly comprises a circuit breaker for each said conductor in each of said plurality of power strips.

11. A system as in claim 1 wherein said power distribution assembly comprises a circuit breaker for each of said N phases.

12. A system as in claim 1 wherein each of said N conductors, within each of said plurality of power strips, which is connected to the same one of said N phases is connected in parallel to that phase within said power distribution assembly.

13. A method for balancing loads in a polyphase power distribution system having N phases, comprising the steps of:
   providing a plurality of power strips, each of said strips comprising:
      N groups of electrical outlets, each of said outlets having a line socket; and
      N conductors, each of said N conductors connected to all said line sockets in a different one of said N groups of outlets;
   providing a power distribution assembly for manually connecting each of said N conductors in each of said strips to a different predetermined one of said N phases and for manually connecting corresponding conductors in different said strips to different predetermined phases;
   providing each of said strips with a cable and plug for connecting to said assembly;
   providing said assembly with a plurality of receptacles for connecting said strips to said assembly;
   providing said power distribution assembly with a power input cable and a power input plug for connecting said assembly to a power source;
   connecting said N conductors in each power strip to said N phases by plugging each said plug into a different one of said plurality of receptacles; and
   plugging said power input plug into an external receptacle.

14. A method for balancing loads as in claim 13 further comprising the steps of:
- providing one or more equipment racks having a total of two or more of said plurality of power strips mounted on said racks; and
- connecting each of said two or more of said plurality of power strips to said power distribution assembly in such a way that said N conductors from each of said two or more power strips are connected to different phases than corresponding said N conductors from each other power strip.

15. A system as in claim 14 further comprising the step of connecting via said assembly each of said two or more of said plurality of power strips to a different power source.

16. A system for balancing loads in a polyphase power distribution system having N phases, comprising:
- a plurality of power strips, each of said strips comprising:
  - N groups of electrical outlets, each of said outlets having a line socket;
  - N conductors, each of said N conductors connected to all said line sockets in a different one of said N groups of outlets;
  - a cable and plug for connecting to a power distribution assembly;
- a power distribution assembly for manually connecting each of said N conductors in each of said strips to a different predetermined one of said N phases and for manually connecting corresponding conductors in different strips to different predetermined phases, said power distribution assembly comprising:
  - a plurality of receptacles for receiving said plug from each of said strips and thereby connecting said plurality of power strips to said assembly;
  - a power input cable and a power input plug for connecting said assembly to a power source; and
- an equipment rack having one or more of said power strips mounted on said rack and having a plurality of equipment-mounting positions, each of said groups of outlets occupying a corresponding location in each of said power strips and each said location being adjacent to a corresponding equipment-mounting position on said rack.

17. A system as in claim 16 wherein said equipment rack has two or more of said strips mounted on said rack and wherein each of said two or more strips is connected via said assembly to a different power source.

* * * * *

UNITED STATES PATENT AND TRADEMARK OFFICE
CERTIFICATE OF CORRECTION

PATENT NO. : 6,628,009 B1
DATED : September 30, 2003
INVENTOR(S) : Chapel

It is certified that error appears in the above-identified patent and that said Letters Patent is hereby corrected as shown below:

Column 1,
Line 57, replace "on the, phases." with -- on the phases. --.

Column 3,
Lines 17 and 20, replace "socket" with -- receptacle --.
Line 21, replace "sockets" with -- receptacles --.

Signed and Sealed this

Ninth Day of December, 2003

JAMES E. ROGAN
*Director of the United States Patent and Trademark Office*